Jan. 10, 1933.   R. SALOMON   1,894,201
MACHINE FOR DRAWING GLASS TUBES OR RODS
Filed July 14, 1928   5 Sheets-Sheet 1
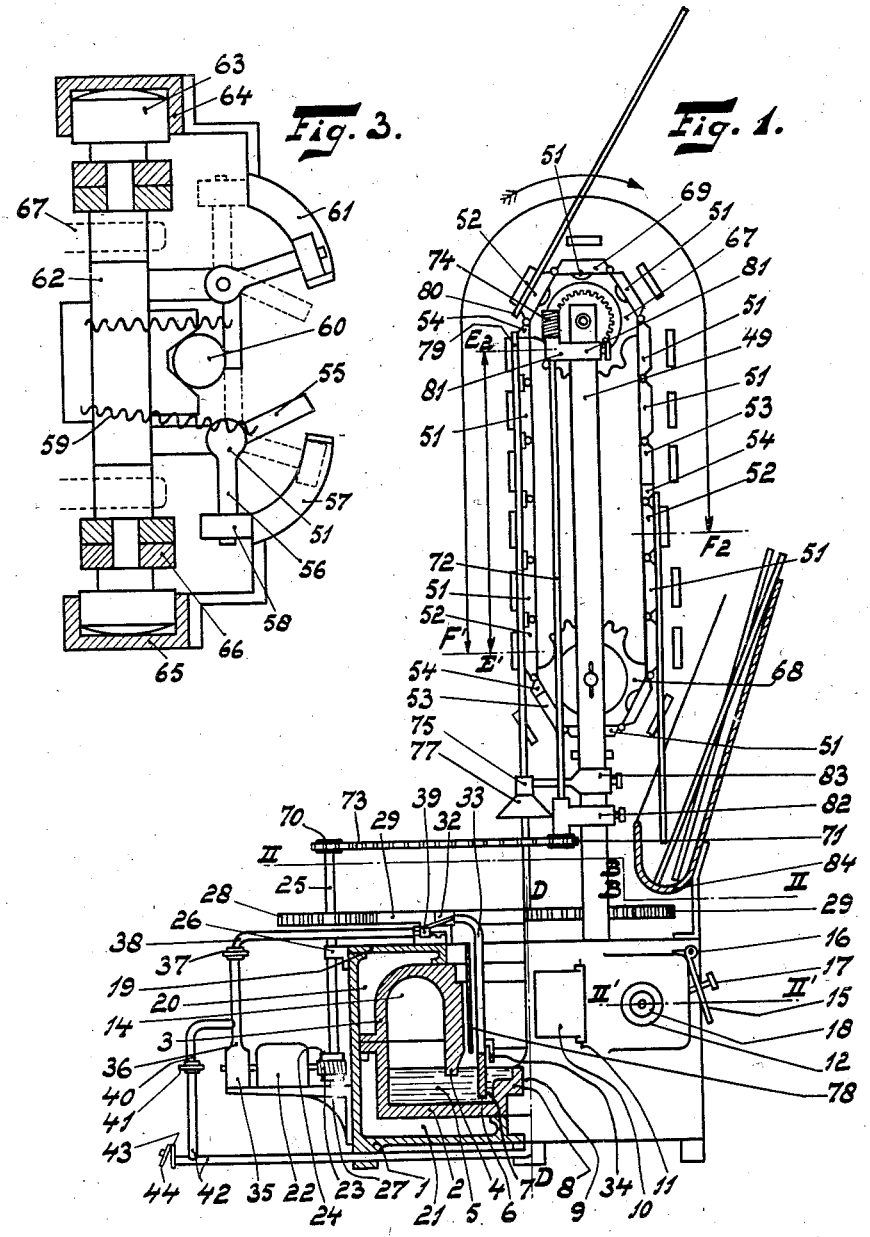
Inventor:
Robert Salomon,
by Langner, Parry, Card & Langner
Att'ys.

Jan. 10, 1933.  R. SALOMON  1,894,201
MACHINE FOR DRAWING GLASS TUBES OR RODS
Filed July 14, 1928  5 Sheets-Sheet 2
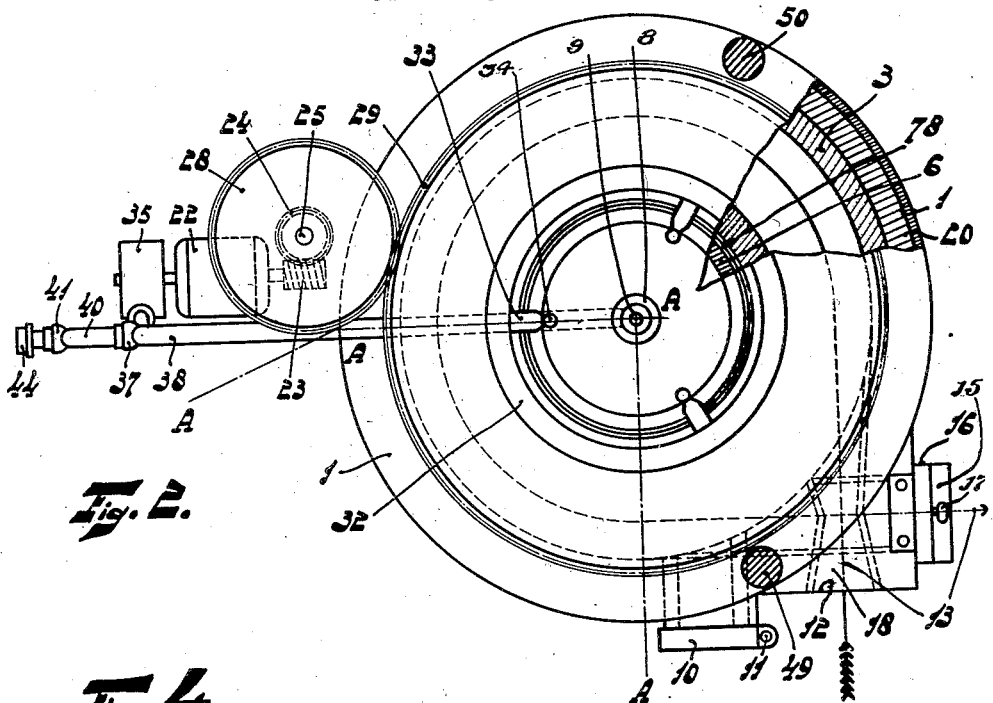
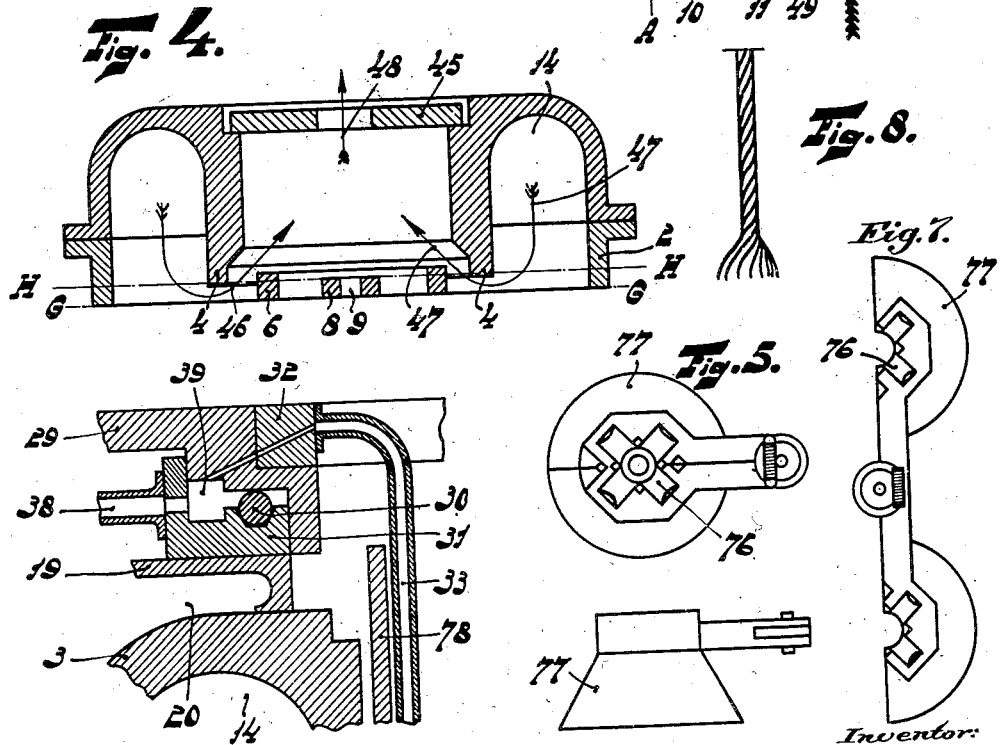
Inventor:
Robert Salomon,

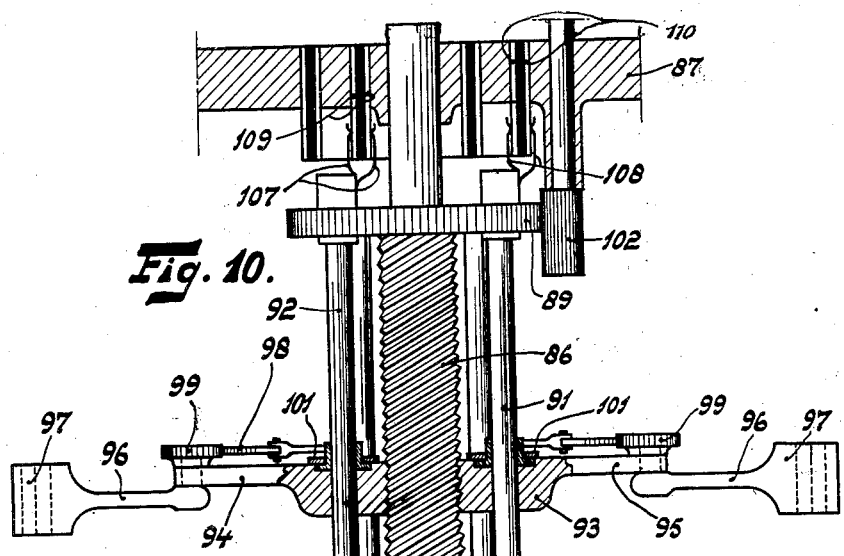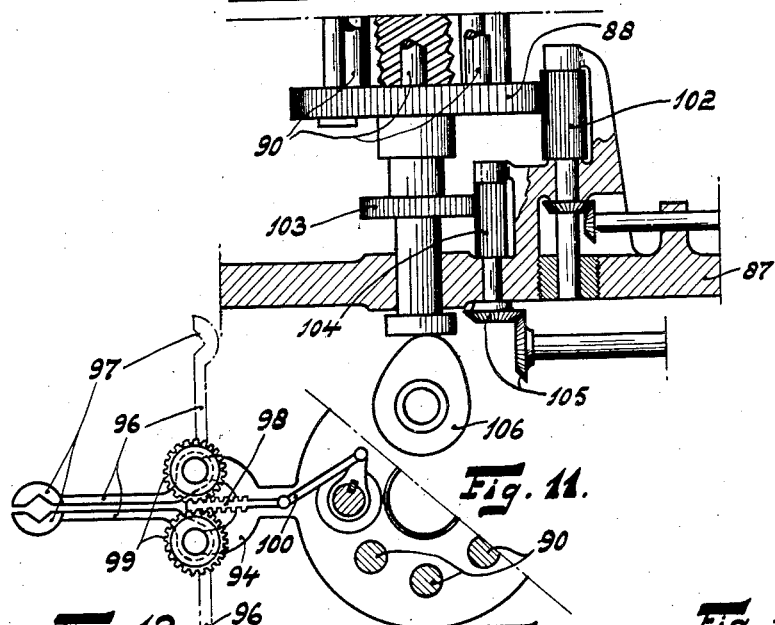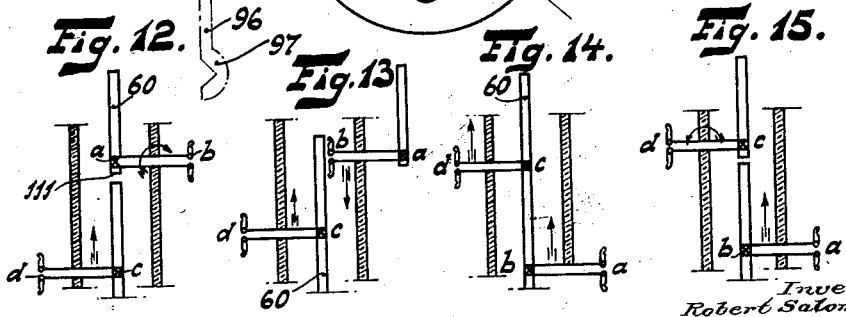

Inventor:
Robert Salomon,
by Lawyer, Party, and Thayer
Att'ys.

Jan. 10, 1933.  R. SALOMON  1,894,201
MACHINE FOR DRAWING GLASS TUBES OR RODS
Filed July 14, 1928   5 Sheets-Sheet 5

Inventor:
Robert Salomon,
by Lauper, Parry, Card & Lauper
Att'ys.

Patented Jan. 10, 1933

1,894,201

UNITED STATES PATENT OFFICE

ROBERT SALOMON, OF NEUILLY SUR SEINE, FRANCE

MACHINE FOR DRAWING GLASS TUBES OR RODS

Application filed July 14, 1928, Serial No. 292,742, and in France July 20, 1927.

The present invention relates to a process and a machine for drawing tubes or rods of glass or any other substance which hardens after passing through the pasty state, more particularly to such a process or such a machine according to which or in which the tubes or rods are drawn vertically or substantially vertically from a furnace.

According to the invention, the whole or part of the bath from which the tube or rod is drawn, is given a rotatory motion relatively to the axis of drawing, owing to which the bath is set in continuous motion, is stirred, so that a homogeneous mass of glass is produced, which has a particularly favourable influence on the character of the drawn tubes or rods. In order to increase the purity of the glass as much as possible, the part of the surface of the bath from which the tube or rod is drawn, is separated from the remainder of the surface, without preventing the communication between the masses of glass situated below the said surfaces.

In accordance with the invention, the part of the surface of the bath from which the tube or rod is drawn, is surrounded by protecting members which permit of regulating the degree of the heating of the said part. It has been found that this affords advantages which are due to the relatively low temperature of the part of the glass from which the tube or rod is drawn.

According to the invention, the drawn tube or rod while being still in a pasty state, may be led through a gauging device which gives them a determined cross-section.

The machine according to the invention is characterized in that the furnace itself or a member provided therein is given a rotatory motion in order to set in rotation the whole or part of the bath from which the tube or rod is drawn.

Different modes of realization of this machine can be imagined. Thus, for example, the furnace may consist of two members which are mounted in such a manner that one is movable with respect to the other, a member floating upon or immerged in the glass being secured to one of these members. For example, the furnace may be provided with a rotatable hearth and a stationary roof to which a member floating upon or immerged in the glass is secured. The glass contained in the hearth follows to a certain extent the rotatory motion of the hearth, the said member being maintained in its fixed position in the rotating glass by the stationary roof so that, so to say, the glass bath is stirred, which is advantageous for obtaining a homogeneous composition of the latter. Alternately, the hearth may be stationary whereas the roof mounted thereon may be rotatable. When a member floating in the glass, is secured to the said roof, it will be rotated by the latter and thus impart a rotatory motion to a portion of the bath. It is also possible, however, to use a stationary furnace and to mount in it an annular member which is rotated about the axis of drawing by a particular device.

The part of the bath from which the tube or rod is drawn, may be surrounded by members in such a manner that it is possible to regulate the temperature of the glass of that part. Owing to this the surface of the part from which the tube or rod is drawn, may have a lower temperature than the remainder of the glass, which facilitates the forming of a glass cone from which the tube or rod has to be drawn.

In conformity to the invention, the furnace may comprise a boss which owing to its arrangement determines the zone of the glass bath from which the tube or rod is to be drawn. This boss may be provided with a central bore which traverses the bottom of the hearth where it may be connected to an air supply conduit. It is possible to arrange in the said bore an adjustable drawing member.

The gauging device destined to give the tubes or rods a determined section may consist of a drawing die but also of rollers or drums which derive their rotatory motion from the friction produced by the motion of the glass which is being drawn. The gauging device may also consist of a plurality of units disposed in sequence. In order to prevent the forming of ridges on the drawn tubes or rods, these units may be angularly spaced apart with reference to one another.

The appended diagrammatic drawings show solely by way of example a constructional form of a machine provided with all of the improvements above specified.

Fig. 1 is a general elevational view of the machine, partly in section on the line A—A—A—A of Fig. 2.

Fig. 2 is a corresponding plan view, with sections on the lines B—B—B—B and C—C of Fig. 1.

Fig. 3 is a diagrammatic view of the drawing grips.

Fig. 4 is an elevational and sectional view of the furnace ready for the lighting.

Fig. 5 is a top plan view of the gauging device for the tubes or rods.

Fig. 6 is the corresponding elevational view.

Fig. 7 is a plan view of the same device, shown in the open position.

Fig. 8 shows a cable whose end is spread out and is thus adapted to be immersed into the mass of glass to start the drawing operation.

Fig. 9 is a vertical section on a larger scale showing a detail pertaining to Fig. 1.

Fig. 10 is an axial section of one of the elements of a drawing device employing slidable carriers.

Fig. 11 is a corresponding plan view.

Figs. 12, 13, 14 and 15 are diagrams explaining the operation of the device shown in Fig. 11.

Figure 16:
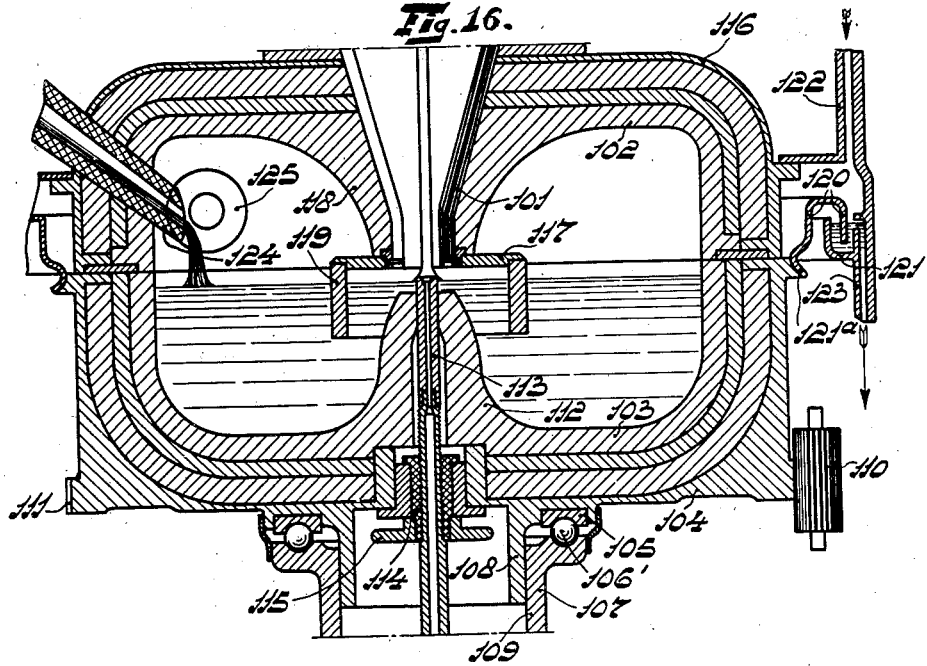
Figs. 16 to 19 are partial axial sections of furnaces.

The lower part of the machine, which may be mounted on a wheeled platform or base to afford a more ready movement, comprises a main frame 1 which may consist of cast iron, for example, at the lower part of which is mounted a hearth 2 of refractory material, adapted to contain the melted glass (Figure 1).

A roof or arch 3 of refractory material and having preferably the form of an annular body of revolution, covers the hearth 2, and its internal wall 4 forms a circular partition whose lower edge is immersed in the mass of the glass 5. A ring 6 is disposed in the interior of the wall 4 and is rotatable on an axis which is properly situated and may for instance coincide with the axis of the hearth 2. When the said ring 6 is rotated, the glass adjacent its immerged walls will be drawn with it in this movement of rotation. A refractory member 8 is disposed upon the edges of a central orifice formed in the bottom of the hearth 2. The upper edge of said member 8 emerges above the surface of the glass, which is bounded on the outside by the rotatable ring 6. If glass tubes are to be drawn, an axial hole 9 is formed in the member 8 through which air (or like gas) may be blown into the interior of the tube. For drawing glass rods, the hole 9 may be dispensed with. The cross-section of the drawn tubes or rods may be as desired, and will be determined by a calibrating device to be further described.

A door 10, pivoted for instance upon an axle 11, serves to supply the furnace with already melted glass or with a composition whose fusion will form the mass of glass for drawing purposes. The said composition may be delivered by mechanical means and at regulated intervals of time, by any suitable devices which need not be represented or described for the proper understanding of the invention. It may be however remarked that the average supply of the said composition is preferably equal to the exit of the drawn glass product issuing from the machine, in order to maintain the level of the melted mass as uniform as possible.

The heating of the furnace may be effected by electrical means, by rows of gas jets disposed in the roof space 14 above the mass of glass, or preferably by a burner. The said burner, which is not shown in the drawings and may have any suitable disposition, sends its flame into the said space through a special aperture 12 formed in the wall of the roof 3. The arrow 13 of Fig. 2 shows the path of the flame, and also the path of the products of combustion in the upper space. The draught of air is regulated by a register which may consist of a shutter 15 pivoted at 16 and provided with an adjustment screw 17. The air entering the interior of the roof space is heated by the hot gases or products of combustion before the latter are discharged. For this purpose, the said space is provided with a double orifice which enables the flame and the gases to separate into two streams between which the air admission conduit 18 is disposed. At its upper part, the furnace is provided with a cover 19 which preferably consists of cast iron. The heat protection of the furnace may be completed by a filling of powdered refractory material at 20 and 21.

As above indicated, the ring 6 may be rotated, and any suitable means may be employed for this purpose without departing from the principle of the invention. By way of example, the following device may be employed.

An electric motor 22 actuates—by a worm 23—a worm wheel 24 keyed to a shaft 25 mounted in the bearings 26 and 27. The said shaft also carries at the upper part a pinion 28 engaging a toothed ring 29 which is disposed—by means of balls 30 or rollers—upon a ball or roller race 31 which is mounted for instance upon the cover 19 of the furnace (Fig. 9). An annular groove may be formed in the race 31 for guiding the said balls. A ring 32 is mounted on a shoulder formed in the toothed ring 29, and it receives, upon its internal face, the tubes 33 which are connected with the ring 6. Any suitable number of such tubes may be used, and this number will vary with the size of the machine.

It may be necessary to employ streams of air to cool the upper surface of the glass in the interior of the ring 6, as well as the surface of the part of the glass which is being drawn at the exit of the hearth, and up to a certain height above the central member 9, and for this purpose an air discharge nozzle 34 (see Fig. 2) is mounted at the lower end of each of the tubes 33. To supply the said tubes with air at the proper pressure, there may be employed the following device which is given solely by way of example and for which like means may be substituted.

An air blower or fan 35, (Figure 1) driven directly by the motor 22, supplies air to a pipe 36 through a regulating register 37 to another pipe 38 leading to a main collecting chamber consisting of an annular recess 39 (see also Fig. 9) formed between the stationary part 31 and the movable part 29. The two parts 31 and 29 are fitted together as accurately as possible so as to reduce the leakage of air. Each tube 33 is supplied with air by the said main chamber 39 with which it is connected as shown in the drawings. The members 29 and 32 are secured together by suitable means, and for instance by spindles. The ring 6, which in the present example is connected angularly with the tubes 33, is preferably free to move in the vertical direction. This result may be obtained by providing in the upper part of the said ring suitable notches adapted to receive the lower ends of the tubes, or arms connected therewith. A cover or screen 78, preferably of refractory material, laterally surrounds the glass-drawing well, and forms an annular screen. The said screen is preferably provided with an internal chamber in which may be circulated the water adapted to cool to the proper degree the part of the glass tube or rod situated above the mass of melted glass. The cover or screen 78 may be secured to the tubes 33 and may extend below the lower ends of the latter, so as to cool the said glass-drawing well from its commencement. If desired, the said ring 6 may be secured directly to the cover or screen 78, and to the outer part of the latter.

In order to deliver air into the interior of the glass tube during the drawing process, I may employ a branch 40 (Figure 1) on the pipe 36 of the blower 35, and may connect said branch 40 with a conduit 42 leading to the inner end of the recess disposed below the perforated member 8. A register 41 may be placed on the branch pipe 40, as well as an outlet 43 provided with a door 44 for the discharge of the excess of air into the atmosphere.

To light the furnace, the ring 6 is disposed upon the bottom of the hearth or upon a mass of solidified glass; the screen 78 and the tubes 33 being removed, I place a cover plate 45 at the top of the furnace, as shown in Fig. 4. The arrows 46—47—48 in this figure show the path of the flame and of the gases of combustion. When the glass 7 has softened to the proper degree, and when it has attained a sufficient level, the cover plate 45 is removed and the furnace set in operation as above specified. It will be noted that the feeding of the furnace should be effected at one or more points on its periphery.

The glass-drawing devices which may be mounted on the above-described furnace to produce the continuous exit of the glass tubes or rods, are of a variable nature. However, the invention covers two improved drawing devices to be further described which may be used for the continuous drawing of the glass into tubes or rods from a mass of glass contained in a furnace or in any other suitable recipient.

Upon the top cover 19 of the furnace are mounted, two uprights which support a device for transporting the glass tubes, consisting of a chain upon which are mounted: (1) the grips 51 of like construction which operate in the same manner and in the same position; (2) the grips 52, also of like construction but differing from the preceding, which operate in the same manner and in the same position; (3) the grips 53 of like construction which operate in the same manner and in the same position.

The grips 51 and 53 are closed when upon the path $E^1$—$E^2$ and are open on the remainder of their path. The grips 52 are closed when on the path $F^1$—$F^2$ and are open on the remainder of their path. The grips 51—52—53 may comprise mechanisms which are analogous in principle, but only the grips 53 are provided with supporting members 54. The grip 51 comprises a first arm 55 which is angularly secured to a second arm 56, said arms forming a bell-crank lever. A stationary ramp 57 causes the grip to open by acting upon a roller 58 mounted on the end of the arm 56. When the said roller is out of contact with the ramp, a spring 59 acts on the grip and thus brings the arm 55 into contact with the glass tube 60 which is held against a supporting jaw as shown in Fig. 3.

The said jaw is preferably cut in a V shape, so that the same grips can be used for tubes or rods whose cross-sections differ in shape and size. The surfaces in contact with the tubes may be faced with a cover of compressed asbestos or like substance. The grips 52 are opened by the stationary ramp 61 which is so disposed as to be entirely out of contact with the rollers of the grips 51 and 53. Reciprocally, the ramp 57 has no action upon the rollers of the grips 52. The said grips are mounted on the links of the chain and are connected together by the axles 62 on which are mounted the rollers 63 movable in stationary guides 64—65 (Fig. 3). The axles 62 are held in position by the links 66 of the chain, the said chain being mounted on two pairs of chain wheels disposed respectively at its upper part at 67 and at its lower part at 68.

The movement of the said chain and its grips may be assured in the following manner. The shaft 25 is provided with a chain wheel 70 which is connected by a chain with a chain wheel 71 keyed to the shaft 72 on whose upper end is mounted the worm 74 coacting with a worm wheel 69 adapted to drive the said chain. The speed at which the glass is drawn out may be varied by changing the ratio of transmission between the shafts 25 and 72, and for instance by placing between these two shafts a change-speed device of any suitable nature.

One of the essential characteristics of the invention consists in the fact that the glass tubes or rods are calibrated by a special device such as the one which is shown in detail in Figs. 5 and 7.

In the example herein represented, the device comprises a head 77 (Figures 5 to 7) made in two pieces which are pivoted to a common support 83 which may be secured at any suitable height upon one of the uprights 49—50. Each part of the head 77 is cut out to receive the rollers 76 which are mounted loose on suitable axles, and of which the outline of the grooves is determined according to the form of the external outline of cross-section of the tube or rod to be obtained. In the example represented, the said rollers are chosen in such manner as to calibrate tubes of round section, and the form of the grooves of said rollers is such that when the two parts of the head 77 are brought and maintained together, the grooves will be juxtaposed in such a manner as to be tangential to the lateral external surface of the cylinder representing the tube or rod. It is obvious that any desired outline may be obtained by a suitable choice of the form of the grooves of the rollers 76.

The invention relates to the application of such a device to machines for the drawing of glass to form tubes and rods, but this device may be doubled or even tripled by the use of like devices which are superposed and are angularly spaced apart, so that the grooves of a roller of one device will obliterate the ridges which may have been produced on the outer surface of the tube at the place of junction of the outlines of two adjacent rollers of the device situated just below. The said rollers may be provided with characters, projections or sunken parts so as to form on the glass suitable indications as to its origin, and also to form grooves whereby the tubes or rods may be more readily cut into sections. The locking of the two parts 77 of the head of the device may be effected by any suitable means, not shown in the drawings. As represented in the drawings, the device is provided with a tapered apron which is adapted to throw into a region outside the glass-drawing well, all impurities or particles which would fall into the said well.

When leaving the devices 75—77, the tube or rod is drawn forward by the grips above mentioned, and is cut into sections of the proper length by a special device whose characteristic feature has been specified in the preamble to the present description. The cutting part of this device may consist of an iron tool which glazes the glass when this is sufficiently hot, or by a thin disc or wheel which rotates at high speed in a plane normal to the axis of the drawing device, and is driven by an electric motor or by like means. To obtain a very clean cut, the disc acts upon the tube perpendicularly to its axis, and as it enters the glass, the wheel and the tube will both move forward along the glass-drawing axis at the same speed. For this purpose, the disc is given two essential movements, comprising a straight movement parallel with the movement of the tube, and at the same speed, upon the path $E^1$—$E^2$, and also a transverse movement with reference to the tube, this latter movement having a reciprocating and an intermittent character. The means by which the said conditions may be realized are extremely variable, and there may be employed any suitable kinematic system synchronized with the movements of the said chain and grips. For this reason the said means have not been represented in the drawings.

It will however be advantageous to mount the disc directly on the shaft of an electric motor which is disposed on a base or frame slidable perpendicularly to the drawing axis, when in its ascent with the chain it meets with the cams or ramps (for example) having suitable outlines. If the said frame is secured to the mounting of a grip 53, for instance, the chain will be provided with as many cutting devices as there are grips 53, but this does not necessarily imply that the three discs operate successively in their order of displacement. The said discs may in fact operate in pairs or in any other manner according to the length of the tubes to be cut off. Also, the connection between the base plate of the cutting device may only be intermittent, and it may be obtained for example by means of a mechanical locking device or by an electro-magnetic device affording a temporary adhesion. The said frame or base will thus follow the ascending motion of a grip 53 for only a part of its path $E^1$—$E^2$. When the disc has finished the cutting of the piece, it is brought to the rear while maintaining its movement at the same speed as the tube, and it is then moved aside to avoid crushing the tubes or rods during the descent by which it is brought to the initial position.

In these conditions, it is evident that only a single cutting device may be used which is periodically coupled to each of the grips 53 when they proceed on the path E¹—E². In any case, the motor or motors actuating the discs need only be supplied with current when the disc acts to cut off a tube or rod. This supply may be obtained by a trolley or like device. It will be remarked that the member 54 prevents all bending of the tube or rod when the cutting wheel operates.

After the cutting operation has been performed, due to the change in the direction of the grips when leaving the straight path E¹—E² and proceeding upon the wheels 67, the upper tube will be clearly separated from the underlying tube engaged in the drawing process. The end 79 of the drawn tube will not rub against the end 80 of the detached tube, and thus the separation will be effected sharply and without any irregular breakage. The detached tube is carried by the grips as shown in Fig. 1 to the point F² at which a grip 52 releases the tube or rod, which is received by a box or trough 84 upon whose inclined face it will lie while being removed from the path of the grips.

Figs. 10 to 15 show a second form of construction of a drawing device for rods or tubes. The said device comprises a plurality of like mechanisms which operate successively and in such manner that the glass is drawn without interruption. One may for instance employ two mechanisms disposed above the glass-drawing well and symmetrical with reference to the centre line of the drawing operation, as shown by the diagrammatic views Figs. 12 to 15.

Each mechanism comprises (Fig. 10) a screw 86 which turns at its journalled ends in the stationary frames 87. The said screw carries two gear wheels 88—89 which are rotatable upon journalled parts of the screw but are held by stops against lengthwise motion; said gear wheels are cross-connected by the rods 90 which are parallel with the screw 86. Two other rods 91—92 are journalled at their ends in suitable bearings formed in the gear wheels 88—89, but are secured to said wheels in the lengthwise direction. The rods 91 and 92 as well as the rods 90 serve as guides for sliding member 93 having at the ends of a diameter the arms 94—95 upon which are pivoted the respective arms 96 provided at the ends with the jaws 97 and which may be moved from or towards one another in order to form grips for seizing the glass tubes or rods. The arms 96 are moved upon their pivot axles by a common rack 98 engaging two pinions 99 which are angularly secured to the arms. Springs are provided and are for instance placed between the gear wheels 99 and the arms 96 in order to effect their angular connection, in such manner that the said springs will act alone in order to complete the stroke of the arms when coming together, in order to seize the tubes or rods of different diameters.

The racks 98 are connected by the links 100 with cranks keyed to the rods 92 and slidable along the said rods. The said cranks are held slidably upon the member 93 by the rings 101 or by like means. The gear wheels 102 mesh with the gear wheels 88—89; these are periodically actuated by any suitable mechanism which is preferably synchronized with the device which rotates the screw 86; the said screw carries a gear wheel 103 engaging a long-toothed pinion 104 actuated by a set of gearing 105 connecting it with a suitable source of power, through the medium of a periodic device for reversing the motion, whose disposition, which may be as desired, is not covered by the invention.

The screw 86 may also be moved lengthwise by means of a cam 106 mounted on a shaft which is synchronized with the other movements of the mechanism.

Each of the rods 91—92 is provided at the top with an angular control mechanism, actuated for instance by a suitable electrical device, supplied with current by the friction of the members 107 upon the conducting rings 109—110 coaxial with the screw 86 and mounted stationary, with reference to the latter, on the frame 87. The said conducting rings are connected with a source of current at stated intervals by a suitable device such as an automatic switch whose motion is synchronized with the other movements of the mechanism. The said switch may have any suitable arrangement without departing from the principle of the invention, and is not shown in the drawings. The invention also covers the case in which the angular control of the rods 91 and 92 is effected mechanically by suitable devices which are synchronized with the control of the screw, and for the purpose of obtaining the results to be further specified.

The operation is as follows:—

In the diagrams shown in Figs. 12 to 15, the two similar mechanisms are symmetrical with reference to the center line of the drawing operation. The grips 96 of Fig. 10 are indicated by $a$ and $b$ for the right-hand mechanism and by $c$ and $d$ for the left-hand mechanism, in Figs. 12 to 15.

It will be supposed that the drawing operation has been commenced, and that a tube 60 has been cut off at 111, the cut-off portion being held by the grip $a$ which is closed. The sliding member 93 which forms a nut upon the screw 86 and which carries the grips $a$ and $b$, turns through one-half revolution and assumes the position shown in Fig.

13; this half-revolution is effected by means of the pinions 102 which are actuated at the proper time and drive the gear wheels 88—89, and the set of rods 90—91—92, around the screw 86. The left-hand mechanism, whose grip $c$ holds the tube which is being drawn out, continues to rise while the tube is being drawn. When the grip $c$ attains the upper end of its stroke, a new cutting is effected by a tube cutting device, which is the same, in principle, as the one described with reference to the apparatus shown in Fig. 1. The sliding member 93 of the right-hand mechanism, due to the rotation of the screw, has now descended after having released the section of tube 60, which latter is received by any suitable container. The grip $a$ is opened by the action of the rack 98 and the pinions 99 whose movement has been effected by one-half revolution of the rod 91 or 92, by means of the electric control above mentioned. The left-hand mechanism then makes one-half revolution in order to discharge the detached section 60 of the tube, while the right-hand mechanism has seized, by the grip $b$ which has made one-half revolution and is now closed, the tube which is in course of drawing. The drawing operation is thus performed in a continuous manner, the stopping of the said grips in the proper position being determined, if necessary, by elastic fastening members which automatically disappear when the pinion 102 comes into action to turn the mechanism through 180°.

It is observed that the screw 86, which turns alternately in one direction and the other, assures the periodic rise and descent of the sliding carrier 93. Obviously, the movements of the screws of the right and left hand mechanisms are suitably disposed in phase relation to obtain the results above indicated. It will be remarked that the arms 96 of the grips are when in the open position (dot-and-dash lines in Fig. 11) withdrawn from the tube-drawing axis so as to permit the rotation— at the proper time—of the sliding carrier 93 and of the whole of one mechanism, without making contact with the tube which is being drawn out by the other mechanism.

When the glass rod or tube has been cut off, the screw 86 of the mechanism which holds in its grip the detached section of tube, is raised by the said cam 106 so as to properly separate the tube section 60 from the tube (or rod) in course of drawing.

Obviously, it will be feasible to employ more than two grips for each mechanism, and more than two mechanisms per apparatus, which mechanisms will be suitably combined to effect the continuous drawing of the glass and the discharge of the detached sections.

In the example shown in Figure 16, the upper stationary part of the furnace comprises the glass-drawing well 101 provided with a water circulation jacket, but the said jacket is stationary, which permits to simplify its mounting on the roof or crown 102. The lower part of the furnace or hearth is so disposed as to rotate on a theoretical axis which coincides with the glass-drawing axis.

For this purpose, the hearth 103 is provided upon its metallic envelope 104 with a bearing member 105 which is supported, through the medium of the balls 106', upon a lower base 107. The centering is further assured by the engagement of a sleeve 108 in a cylindrical bearing member 109 coaxial with the base member 107.

The said chamber or hearth is rotated in a very simple manner by means of one or more long-toothed driving pinions 110 co-operating with teeth formed upon or secured to the casing 104 of the chamber. This latter may be raised or lowered without disengaging the said pinion 110 from the teeth 111. The said chamber is provided with a refractory revetment 103 which comprises a central boss 112, apertured for the insertion of a refractory drawing member 113 which can be vertically adjusted with reference to the level of the glass in the hearth or chamber by a nut and hand-wheel device (114—115). When glass tubes are to be drawn the member 113 is apertured, but it may be imperforate for the drawing of rods.

The stationary upper part of the furnace comprises a metallic envelope 116 and a refractory revetment or roof 102 having a central tapered part 118 in which is disposed the said water jacket of the glass-drawing well 101; the said jacket descends as far as the refractory disc 117 which is secured in any suitable manner to the tapered part 118; the edges of said disc are in contact with the refractory ring or partition 119 which floats in the mass of glass in fusion. The ring 119 is not rotatable; it is held in the fixed position by its contact with the disc 117, or it may be suitably secured to the latter. The glass-drawing operation is started, commencing with the upper end of the member 113 as above set forth.

The heating chamber of the furnace is made fluid tight in the following manner.

A double shoulder or flange 120 is mounted, by means of a tapered packing member 121ª, upon the upper edge of the metallic envelope 104 of the furnace, and its external part is immersed in an annular trough 121 which is secured in any suitable manner to the stationary upper part of the furnace. Cold water is supplied to the said trough by a conduit 122, and the level in the trough is determined by one or more overflows 123. The hydraulic joint thus formed will prevent all exit of smoke to the atmosphere as well as any improper admission of air into the furnace.

In order to open the furnace, the shoulder 120 and the tapered edge 121ª of the envelope 104 are separated the hearth portion can thus be removed, and the shoulder or flange 120 remains suspended from the trough 121.

The hearth is supplied through a door which opens below the roof 102, or by a refractory conduit 124 adapted for the supply of melted glass or of the composition which produces the glass when melted.

One or more burners 125 serve to heat the mass of glass to the proper temperature. The products of combustion escape, after circulating in the roof space, through a discharge flue, and if necessary they may traverse a heat recovery device, being thence discharged through a chimney or stack.

The operation is as follows:

The melted glass or the composition is supplied through the conduit 124 and drops upon the rotating mass which is caused to move, by the drawing action, into the interior of the stationary partition 119 by which the glass is stirred.

In each of the forms illustrated, at least a part of the molten glass is caused to rotate. During this rotation, the drawing operation is carried on. The annular wall together with the cover shown in some of the modifications maintains an absolutely constant temperature at the drawing point and symmetry in the bath. By symmetry it is meant that in any horizontal plane there is the same degree of viscosity in the glass at all points which are equally spaced from the axis. This is important because the temperature of the glass varies with the distance from the vertical axis and from the surface level. As a result there is a change in the viscosity of the glass which causes a "skin" to form on the surface. Without some means to maintain a constant temperature, and without some means to prevent it, the point at which the glass is drawn from the bath has a tendency to wander away from the axis of symmetry and towards the points of lower temperature. When such is the case it is impossible to secure an even product.

Figure 17:
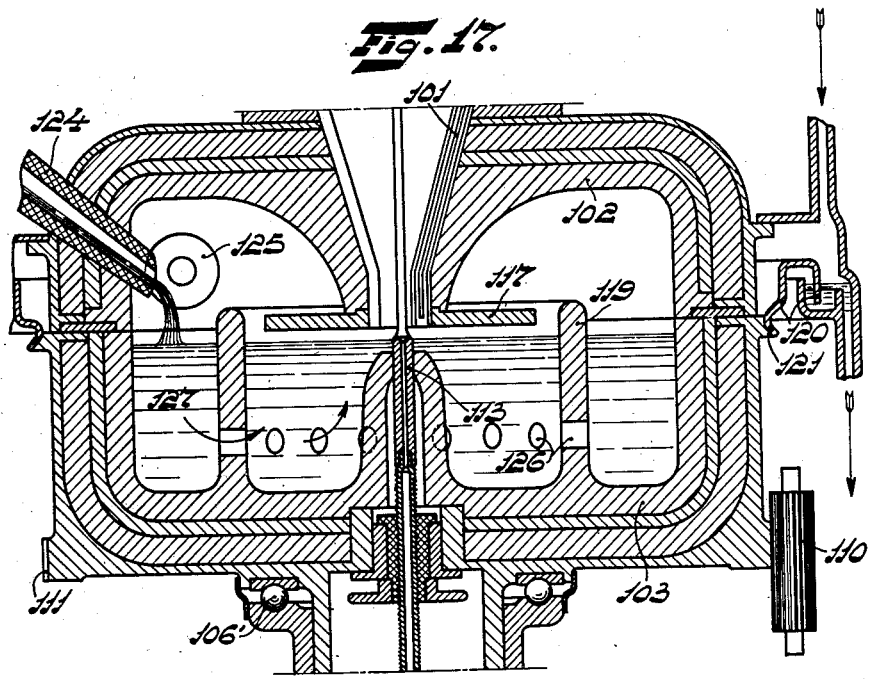

In the apparatus shown in Figure 17, the chamber or hearth 103 is also rotatable and is disposed as in the preceding example. The same reference figures indicate similar parts, or corresponding parts, in all the figures of the drawings. However in this case, the refractory partition or wall 119 is formed in one with the revetment of the hearth or chamber, and it is apertured at 126 for the circulation of the glass. The material is supplied through the conduit 24 into the annular space 127. The melted glass proceeds into the interior of the partition 119 through the apertures 126, as shown by the arrows.

Figure 18:
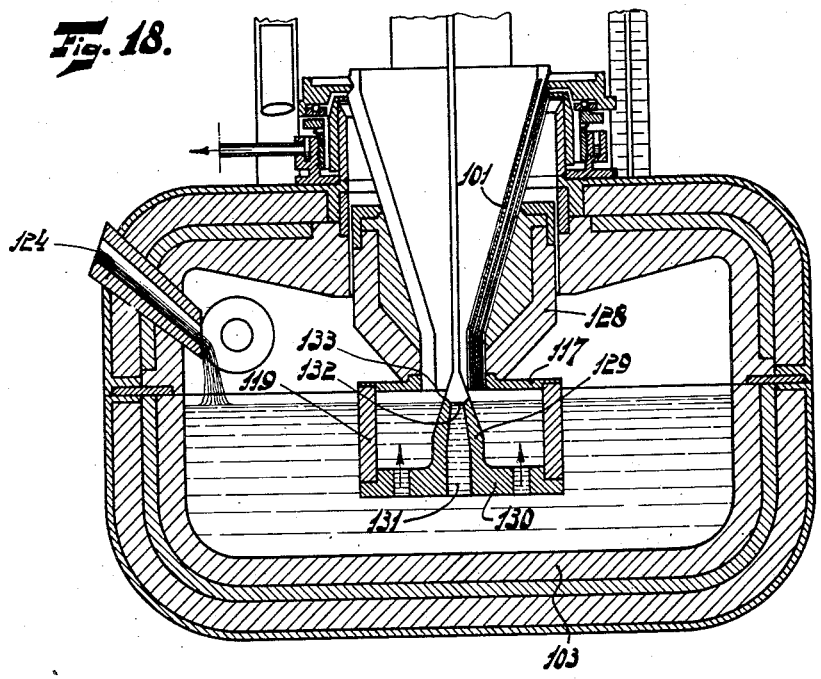

Figure 18 shows a furnace with stationary hearth. The tapered refractory member 28 which carries the water jacket of the glass-drawing well 101, is rotatable and is actuated by a suitable driving mechanism. However, the bottom of the chamber 103 is not apertured for the insertion of the glass-drawing piece; this latter is replaced by a refractory nozzle 129 provided with a perforated bottom plate 130 which floats in the mass of glass and is in contact with the bottom of the partition wall 119 held against the edge of the rotating disc 117 mounted on the member 128. The pressure due to the displacement of the glass is sufficient to assure the angular connection between the three parts 117—119—130 which rotate with the drawing well. These three members may also be secured together or may be held in the fixed position in the angular direction by any suitable means. When glass rods are to be drawn, the nozzle 129 is preferably replaced by an imperforate member. For the drawing of tubes, the arrangement shown in the figures is employed. The glass rises in the axial conduit 131 to a level adjacent that of the mass of glass in the recipient. It should be remarked, as concerns the drawing of tubes, that the surface 132 of the glass remains free, and to prevent it from being drawn forward, the nozzle 129 comprises an edge 133 which is somewhat above the level 132.

Figure 19:
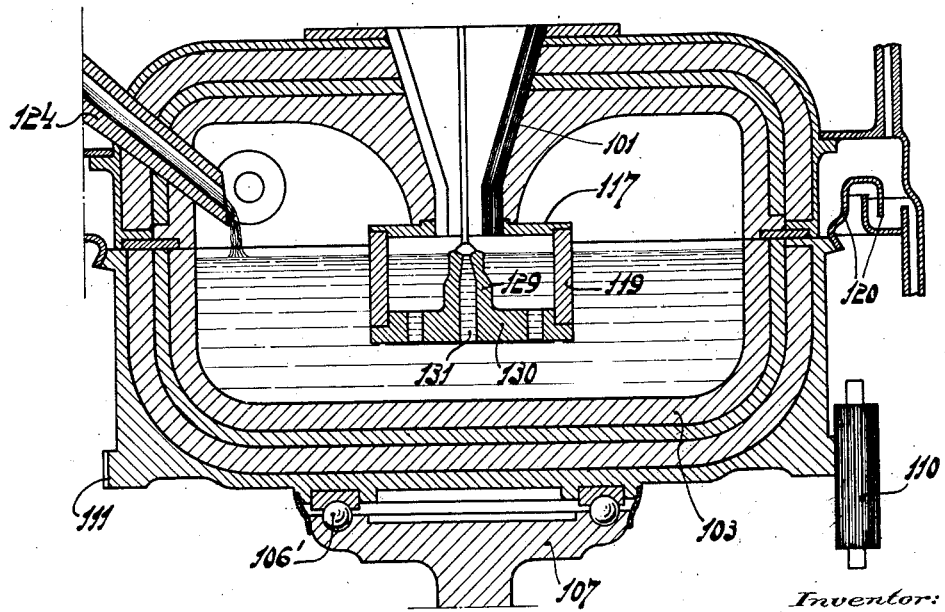

Figure 19 shows a furnace having a rotary hearth 103 and a stationary glass-drawing well 101 as in the apparatus shown in Figures 16 and 17, but provided with a glass-drawing device analogous to the one shown in Figure 18, and herein the three elements 117—119—130 are angularly secured with reference to the water jacket 101, due to their adhesion under the pressure of the glass, or to the fact that they are secured or held by any suitable means. Except for these dispositions, the other arrangements as well as the functioning are the same as are specified in the preceding description.

As above indicated, the aforesaid improvements may be separately employed upon the known glass-drawing machines or may be combined in suitable number upon such machines. They may further be employed in the construction of a new type of machine which comprises, as specified, a furnace adapted for the production or the melting of a certain mass of glass and which, by reason of its reduced size, is suitable for use in industries in which glass articles do not form the essential features of the production.

The said improvements are susceptible of various forms of realization differing in the details and the constructional features. All such forms of realization, provided they comprise the characteristics set forth in the preceding description and offer no change in the object to be attained, will be covered by the said invention.

What I claim is:

1. A machine for drawing glass tubes or rods comprising a container or crucible adapted to contain molten glass, means for rotating said container, a boss mounted in said container, a boss mounted in said container and projecting above the free surface of the molten glass, and a closed insulating chamber surrounding the boss at a small distance therefrom, the said chamber and the said container being relatively movable with respect to each other.

2. A machine for drawing glass tubes or rods comprising a container or crucible containing molten glass, means for rotating said container, a boss mounted in said container and projecting to a convenient height above the level of the molten glass, the said boss thus defining a drawing point, an annular wall surrounding said boss, and an upper cover for said annular wall, the said cover and the said annular wall constituting a tight insulating chamber around the said drawing point.

3. A machine for drawing glass tubes or rods comprising a container or crucible adapted to contain molten glass, means for rotating said container, a boss mounted in said container and projecting above the free surface of the molten glass, a stationary, closed insulating chamber surrounding the said boss at a small distance therefrom, a stationary tight cover for the said rotatable crucible, and a seal for said last mentioned cover comprising a double collar and a receptacle containing water into which said collar dips.

4. A machine for drawing glass tubes or rods comprising a container or crucible containing molten glass, means for rotating said container, a boss mounted in said container and projecting above the free surface of the molten glass, the said boss thus defining a drawing point, an annular wall surrounding said boss, a cover closing the said wall at the top thereof, the said wall and the said cover thus constituting a tight insulating chamber around the drawing point, and a stationary tight cover for said rotating crucible, the said annular wall being fixed to the said last mentioned stationary cover.

5. A machine for drawing glass tubes or rods comprising a container or crucible containing molten glass, means for rotating said container, a boss mounted in said container and projecting above the free surface of the molten glass, the said boss thus defining a drawing point, an annular wall surrounding said boss, a cover closing the said wall at the top thereof, the said wall and the said cover thus constituting a tight insulating chamber around the drawing point, and a stationary tight cover for said rotating crucible, said annular wall and the said covers being securely attached to each other.

6. A machine for drawing glass tubes or rods comprising a crucible adapted to contain molten glass, an upwardly directed mandrell terminating above the bottom of said crucible to constitute the point from which the glass is drawn upwardly in the direction of said mandrel, an annular wall coaxially surrounding said mandrel a short distance therefrom, a cover for said crucible provided with a supply opening and a burner carried by said cover, at least one of the aforementioned elements being arranged for rotation relative to the other elements about the axis of said mandrel.

7. A machine for drawing glass tubes or rods comprising a crucible adapted to contain molten glass, a mandrel terminating within said crucible to constitute the point from which the glass is drawn upwardly in the direction of said mandrel, an annular wall coaxially surrounding said mandrel at a short distance, a cover for said crucible provided with a supply opening, a burner carried by said cover, and a cooling jacket of circular cross-section concentrically arranged for rotation relative to the other elements about the axis of said mandrel.

8. A machine for drawing glass tubes or rods comprising a crucible adapted to contain molten glass, a mandrel terminating within said crucible to constitute the point from which the glass is drawn upwardly in the direction of said mandrel, an annular wall coaxially surrounding said mandrel a short distance therefrom, a cover for said wall to form therewith an insulating chamber for the portion of the molten glass from which the tube or rod is drawn and means including said annular wall arranged for rotation relative to said container whereby the glass particles will be caused to approach said mandrel along spiral paths relative to the container and whereby within said chamber a condition of viscosity of the molten glass will be produced which is symmetric relative to said axis.

9. A machine for drawing glass tubes or rods comprising a crucible adapted to contain molten glass, a mandrel terminating within said crucible and emerging from the glass to constitute the point from which the glass is drawn upwardly in the direction of said mandrel, an annular wall coaxially surrounding said mandrel at a short distance, a cover for said wall to form therewith an insulating chamber for the portion of the molten glass from which the tube or rod is drawn, said wall being arranged for rotation about said axis and means for rotating said wall.

10. The combination set forth in claim 7 wherein said cooling jacket is rotatable about the axis of the mandrel and means are provided for rotating said cooling jacket.

11. In the combination set forth in claim 7, nozzles for cooling air opening into the interior of said cooling jacket above the mandrel, whereby the glass around and above the latter may be chilled.

12. A machine for drawing glass tubes or rods comprising a crucible adapted to contain molten glass, a vertical mandrel arranged within said crucible to constitute the point from which the glass is drawn in vertical direction, an annular wall coaxially surrounding said mandrel at a short distance, a cover for said crucible provided with a supply opening, a burner carried by said cover and a cooling jacket of annular cross-section concentrically arranged relative to and above said mandrel, said cooling jacket and said annular wall being arranged for common rotation relative to at least one of said other elements.

13. A machine for drawing glass tubes or rods comprising a stationary crucible adapted to contain molten glass, a vertical mandrel rotatably arranged within said crucible about its axis and terminating substantially at the level of said molten glass, to constitute the point from which the glass is drawn upwardly in the direction of said axis, an annular wall coaxially surrounding said mandrel at a short distance and means for rotating said annular wall about said axis.

14. A machine for drawing glass tubes or rods comprising a crucible adapted to contain molten glass, a chamber arranged within said crucible to immerge into the molten glass and consisting of a circular side wall, of a bottom wall and of a top wall, the latter having a central opening, an upwardly projecting mandrel on the bottom wall in coaxial relation to said opening and adapted to constitute the point from which the glass is drawn in vertical direction, ports providing for a communication between the interior of said chamber and the crucible, and means for causing relative rotation between said crucible and said chamber.

15. A method of drawing glass tubes and rods from a molten bath which consists in rotating the molten glass about a vertical axis and simultaneously drawing the skin forming on the free level of said bath upwardly over a vertical mandrel terminating substantially at said level whereby the point of drawing remains constant and a condition of viscosity symmetrical relative to the axis of the mandrel is secured.

16. A method of drawing glass tubes and rods from a molten bath which consists in, rotating the molten bath about a vertical axis, drawing the skin forming on the surface of the molten glass from the free surface of said bath upwardly in the form of an annulus over a vertical mandrel to cause the vertical axis of said annulus to remain constant, and simultaneously protecting a portion of the surface glass around the drawing point to cause the temperature thereof to remain constant regardless of the temperatures surrounding said portion of the glass.

17. A method of drawing glass tubes and rods from a molten bath which consists in causing the glass to assume a state of symmetry about a vertical axis, and drawing the skin forming on the free surface of said bath radially towards and upwardly along the said vertical axis.

18. A method of drawing glass tubes and rods from a molten bath which consists in rotating the glass about a vertical axis and drawing the skin forming on the free surface of said bath radially towards and upwardly along the said vertical axis, whereby a condition of viscosity symmetrical relative to the axis is secured.

19. A method of drawing glass tubes and rods which consists in drawing the skin forming on the surface of a molten mass radially towards over and in contact with a vertical mandrel, thereby dividing the glass into three portions, the drawn glass, the glass contacting with the mandrel, and the remainder of the mass, and causing relative rotation between at least two of the portions.

20. A method of drawing glass tubes and rods from the surface of a molten mass and over and in contact with a mandrel, and causing relative rotation between the glass contacting with the mandrel and the remainder of the glass in the molten mass, whereby a condition of viscosity symmetrical relative to the axis of the mandrel is secured.

In testimony whereof I have signed my name to this specification.

ROBERT SALOMON.